US008495054B2

(12) United States Patent
Tsudaka

(10) Patent No.: US 8,495,054 B2
(45) Date of Patent: Jul. 23, 2013

(54) LOGIC DIAGRAM SEARCH DEVICE

(75) Inventor: Shinichiro Tsudaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 20 days.

(21) Appl. No.: 13/366,693

(22) Filed: Feb. 6, 2012

(65) Prior Publication Data

US 2012/0203775 A1 Aug. 9, 2012

(30) Foreign Application Priority Data

Feb. 7, 2011 (JP) ................................ 2011-023511
Dec. 20, 2011 (JP) ................................ 2011-277760

(51) Int. Cl.
*G06F 17/30* (2006.01)

(52) U.S. Cl.
USPC .......................................... 707/713; 707/798

(58) Field of Classification Search
USPC ................................................. 707/713, 798
See application file for complete search history.

(56) References Cited

U.S. PATENT DOCUMENTS

2003/0237065 A1    12/2003    Matsuzaki et al.

FOREIGN PATENT DOCUMENTS

| JP | 8-7754 | 1/1996 |
| JP | 2004-21944 | 1/2004 |
| JP | 2004-259087 | 9/2004 |
| JP | 4139249 | 6/2006 |
| JP | 2008-146300 | 6/2008 |

OTHER PUBLICATIONS

Niloofar Fazlollahi, David Starobinski, and Air Trachtenberg, "Connecting Identifying Codes and Fundamental Bounds", IEEE, Dept. of Electrical and Computer Engineering, Boston University, Feb. 6-11, 2011, pp. 1-7.*
Microsoft: Xiaogin Sun, Marc Holder, Chao He, ip.com, "Fast Random Codebook Search for Speech Coders", an IP.com Prior Art Database Technical Disclosure, Apr. 16, 2008.*
"Introduction into IEC 61131-3 Programming Languages", http://www.plcopen.org/pages/tc1_standards/iec_61131_3/ . International Standard IEC 61131-3, Oct. 21, 2008.

* cited by examiner

*Primary Examiner* — Cheryl Lewis
(74) *Attorney, Agent, or Firm* — Oblon, Spivak, McCelland, Maier & Neustadt, L.L.P.

(57) ABSTRACT

A logic diagram search device of the present invention includes a movement amount estimation section, a computation element/signal line correspondence calculation section, and a similarity degree calculation section. The movement amount estimation section estimates a diagram movement amount between a criterion diagram and a comparative diagram based on a coordinates variation amount. The computation element/signal line correspondence calculation section generates correspondence between a signal line in the criterion diagram connecting the computation elements that have been objects of a correspondence generation operation and a signal line in the comparative diagram connecting the computation elements that have been objects of the correspondence generation operation. The similarity degree calculation section calculates the degree of similarity between the criterion diagram and the comparative diagram based on the computation elements and the signal lines for which the correspondence is generated.

8 Claims, 9 Drawing Sheets

TYPE K

| P | Q | COORDINATES VARIATION AMOUNT | |
|---|---|---|---|
| | | X | Y |
| P1 (2, 3) | Q1 (7, 7) | 5 | 4 |
| P2 (5, 8) | Q2 (3, 3) | -2 | -5 |
| P3 (8, 1) | Q3 (13, 5) | 5 | 4 |

FIG. 11

TYPE K

| P | V | Q |
|---|---|---|
| P1 (2, 3) | (7, 7) | ○ |
| P2 (5, 8) | (10, 12) | × |
| P3 (8, 1) | (13, 5) | ○ |

FIG. 12

COMPUTATION ELEMENT CORRESPONDENCE TABLE

| P | Q |
|---|---|
| P1 (2, 3) | Q1 (7, 7) |
| P3 (8, 1) | Q3 (13, 5) |
| P2 (5, 8) | Q2 (10, 12) |

FIG. 13

SIGNAL LINE CORRESPONDENCE TABLE

| L | M |
|---|---|
| P1 ↔ P3 | Q1 ↔ Q3 |
| P1 ↔ P2 | Q1 ↔ Q2 |

LOGIC DIAGRAM SEARCH DEVICE

BACKGROUND OF THE INVENTION

1. Field of the Invention

The present invention relates to a logic diagram search device, and particularly to a search for a logic diagram used for writing a logic or the like.

2. Description of the Background Art

In a monitor control system, for example, a control logic or the like is written using computation elements that perform various computing operations and the like on signals and connection lines (signal lines) that connect the computation elements to indicate flows of the signals. In this specification, a diagram written mainly using the computation elements and the signal lines in this manner is called a logic diagram. For example, a function block diagram shown in International Standard IEC 61131-3 is one type of the logic diagram.

The logic diagram is one form of expressing a program, and has an advantage that a behavior thereof is easier to understand even for someone who is not a skilled programmer, as compared with a program written using a programming language such as C or Java (registered trademark). However, there are problems, for example, that the volume tends to increase because it is expressed in the form of a diagram, and that it is necessary to consider a layout of the computation elements and the connection lines in order that the program can be written in an easy-to-see and easy-to-understand manner.

Because of the above-mentioned disadvantages, in a programming for expression using the logic diagram, a copied version is often edited and then completed as a program. Additionally, particularly in a large-scale system or a system including many redundant systems, such as a monitor control system, the above-described development process is often employed because there are a large number of similar hardware and functions of software for controlling the hardware are also similar with one another. This consequently causes a problem that the logic diagram is further increased, which lowers the maintainability, the reliability, and the productivity of the system.

If a similarity search can be implemented in the logic diagram, a similar logic that frequently appears can be formed as a component part, and thus the maintainability and the productivity can be improved.

Moreover, in a case where a part of a logic to be prepared is known, a similar logic diagram can be searched for, and development can be made with reference to the similar logic, which can improve the productivity.

Furthermore, in a case where a failure occurs in a certain logic, a similar logic diagram can be searched for so that another part having the failure can be corrected before the failure becomes apparent.

As an example of the case where the similarity search in the logic diagram is implemented, Japanese Patent No. 4139249 may be mentioned. The disclosure of Japanese Patent No. 4139249 relates to verifying whether or not two CAD drawings stored in different formats originally show the same CAD drawing. A correspondence relation (including one-to-many correspondence) between graphics included in two CAD drawings is calculated based on coincidence of types of the graphics and coincidence of coordinates of the graphics within a predetermined range. Thus, whether or not the CAD drawings are identical to each other is verified based on whether or not there is any combination of one-to-one correspondence with respect to all of them.

Additionally, Japanese Patent No. 2096866 may be mentioned as an example of the case where the similarity search in a diagram is implemented. In Japanese Patent No. 2096866, a diagram made up of symbols and connection lines is recorded with a tree structure obtained by simplifying the diagram according to a criterion, and, based on an inputted search condition, a tree structure resulting from simplification according to the same criterion is obtained. Thus, coincidence between the tree structures is examined, thereby achieving a similarity search in the diagram.

In Japanese Patent No. 4139249, the CAD drawing contains a drawing element such as a line segment and a rectangle. By using the drawing element such as the line segment and the rectangle to express the connection line and the computation element of the logic diagram, the logic diagram can be expressed as a CAD drawing.

Accordingly, the verification of whether or not the CAD drawings are identical to each other as disclosed in Japanese Patent No. 4139249 is also applicable to the logic diagram. Therefore, also for a copied version of the logic diagram without any editing or the like made thereto, the determination of whether or not diagrams are identical to each other can be made while absorbing a difference in position information within a predetermined range.

However, in this determination method, in a case where a difference in the position of the connection line is beyond the predetermined range, it is determined that diagrams are not identical to each other. For example, if the positions of the connection lines are different from each other, it is determined that diagrams are not identical to each other.

In the logic diagram, the basis of the determination of whether the connection lines are logically identical to each other is not a position of coordinates of the connection line, but whether or not a situation of connection at both ends of the connection line is identical. In many cases, although the positions of the computation elements and the signal lines may be changed to facilitate the understanding, such a change does not make logic diagrams logically different from each other. Moreover, a copied version of the logic diagram is rarely used as it is, and normally, an addition of the computation element and the connection line, a change of an attribute, and the like, are made. As for a logic diagram obtained by copying and pasting a part of the logic diagram, coincidence of the position information cannot be expected.

Considering the above, Japanese Patent No. 4139249 involves a problem that a scale indicating the degree of logical similarity between two diagrams cannot be given.

On the other hand, in Japanese Patent No. 2096866, the diagram is made up symbols and connection lines. By recognizing the computation element of the logic diagram as the symbol, the similarity search in the diagram disclosed in Japanese Patent No. 2096866 can be performed. In this similarity search, the relationship of the symbols and the connection lines extracted from a searching object diagram is simplified into a tree structure according to a criterion and then recorded. The inputted search condition is subjected to the same process and formed into a tree structure, and coincidence of the two tree structures is examined.

In this similarity search, however, the similarity search can be performed only in a range where the computation elements (in Japanese Patent No. 2096866, the symbols) are omitted according to the criterion. This search cannot be applied to a case where a part of the computation element is changed. Although it is possible to perform the similarity search by examining the degree of coincidence between the tree structures, matching is made from a computation element located at a root of the tree structure, and therefore if the computation element located at the root is changed, completely no matching is made.

As a result, in a case where the logic diagram is copied and then modified, it may be determined that there is no similarity, even though the modification is very small. If the search is performed while enumerating all elements that may be located at roots of the tree structure, the accuracy of the similarity search is improved, but time required for the search is increased accordingly.

SUMMARY OF THE INVENTION

An object of the present invention is to provide a logic diagram search device that allows a high-speed and accurate search for a logic diagram that is logically similar with a logic diagram.

A logic diagram search device of the present invention includes: a detection section, a movement amount estimation section, a correspondence generation section, and a similarity degree calculation section. The detection section detects a coordinates variation amount between each computation element in a criterion diagram and a computation element in a comparative diagram having a corresponding type. The movement amount estimation section estimates a diagram movement amount between the diagrams based on the coordinates variation amount. The correspondence generation section moves the computation element in one of the diagrams based on the diagram movement amount, and generates correspondence in coordinates and a type of the computation element between both diagrams, and generates correspondence between a signal line in the criterion diagram connecting the computation elements that have been objects of a correspondence generation operation and a signal line in the comparative diagram connecting the computation elements that have been object of the correspondence generation operation. The similarity degree calculation section calculates the degree of similarity between the criterion diagram and the comparative diagram based on the correspondence.

In the present invention, the correspondence can be generated between the computation elements and the signal lines conforming to the diagram movement amount, to appropriately calculate the degree of similarity between the criterion diagram and the comparative diagram.

These and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a data diagram showing the process performed by the temporary computation element correspondence calculation section 107 of the logic diagram search device according to the preferred embodiment 1;

FIG. 12 is a diagram showing a computation element correspondence table of the logic diagram search device according to the preferred embodiment 1;

FIG. 13 is a diagram showing a signal line correspondence table of the logic diagram search device according to the preferred embodiment 1;

DESCRIPTION OF THE PREFERRED EMBODIMENTS

A. Preferred Embodiment 1

<A-1. Configuration>

Figure 1:
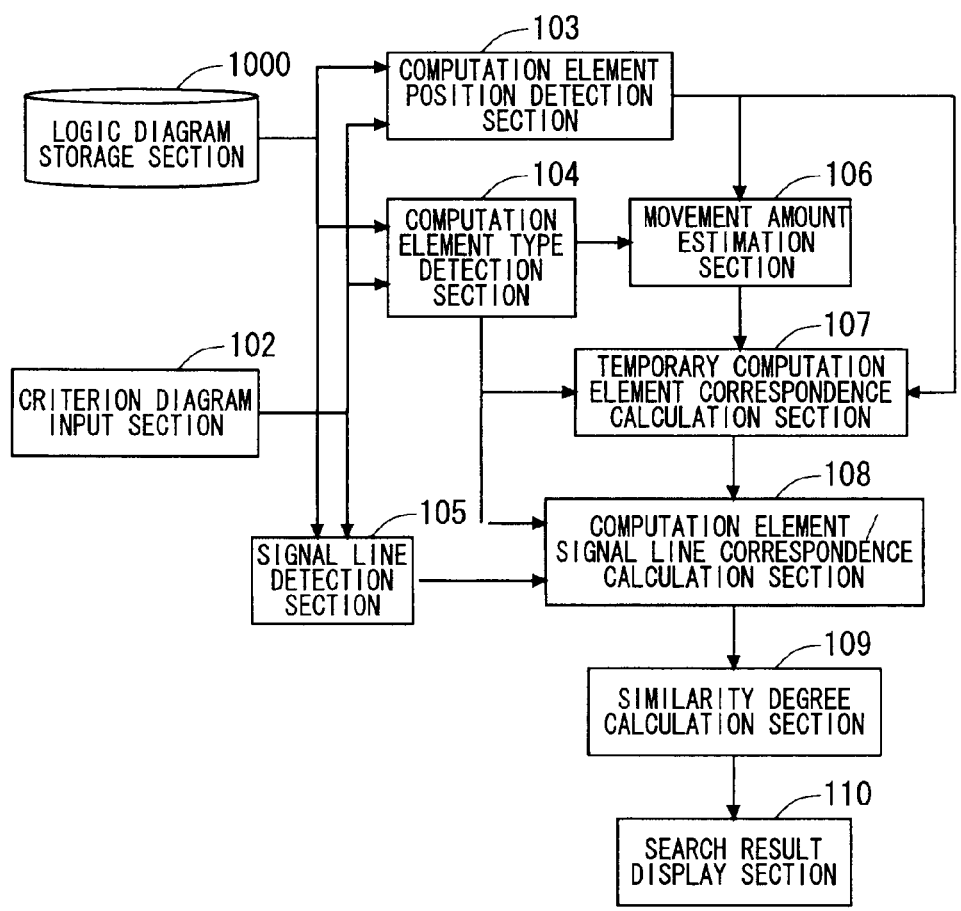
FIG. 1 is a block diagram of a logic diagram search device according to a preferred embodiment 1.

FIG. 1 shows a configuration of a logic diagram search device according to the present invention. As shown in FIG. 1, the logic diagram search device includes a logic diagram storage section 1000 and a criterion diagram input section 102.

The logic diagram search device further includes a signal line detection section 105, a computation element position detection section 103, and a computation element type detection section 104, which are connected to the logic diagram storage section 1000 and the criterion diagram input section 102.

The logic diagram search device further includes a movement amount estimation section 106 and a temporary computation element correspondence calculation section 107, which are connected to the computation element position detection section 103 and the computation element type detection section 104.

The logic diagram search device further includes: a computation element/signal line correspondence calculation section 108 which is connected to the computation element type detection section 104, the temporary computation element correspondence calculation section 107, and the signal line detection section 105; a similarity degree calculation section 109 connected to the computation element/signal line correspondence calculation section 108; and a search result display section 110 connected to the similarity degree calculation section 109.

The logic diagram storage section 1000 stores a plurality of logic diagrams that are searching objects. The criterion diagram input section 102 serving as a supply section receives and supplies an input of a logic diagram that serves as a criterion for comparison in a similarity search. This inputted logic diagram is called a criterion diagram. One of the logic diagrams stored in the logic diagram storage section 1000, or a diagram obtained by editing it by addition, removal, and the like, may be selected as the criterion diagram, and inputted to the criterion diagram input section 102.

On the other hand, a logic diagram serving as a comparison object in the similarity search is selected from the logic diagram storage section 1000. This selected logic diagram is called a comparative diagram.

The computation element position detection section 103 serving as a detection section detects a position of coordinates on the diagram of each of a plurality of computation elements of one or more types that are shown in the logic diagrams obtained from the criterion diagram input section 102 and the logic diagram storage section 1000.

The computation element type detection section 104 serving as a detection section detects the type of each of the computation elements that are shown in the logic diagram obtained from the criterion diagram input section 102 and the logic diagram storage section 1000. In other words, the computation element type detection section 104 detects an attribute, and the like, of the element other than information of the position of coordinates.

The signal line detection section 105 detects a type (such as a terminal type of analog/digital or input/output) of a signal line and the computation elements located at both sides of the signal line, with respect to signal lines (connection lines) connecting the computation elements to each other that are shown in the logic diagrams obtained from the criterion diagram input section 102 and the logic diagram storage section 1000.

The movement amount estimation section 106, the temporary computation element correspondence calculation section 107, the computation element/signal line correspondence calculation section 108, and the similarity degree calculation section 109 perform processes by using the criterion diagram and the comparative diagram.

<A-2. Operation>

Figure 2:
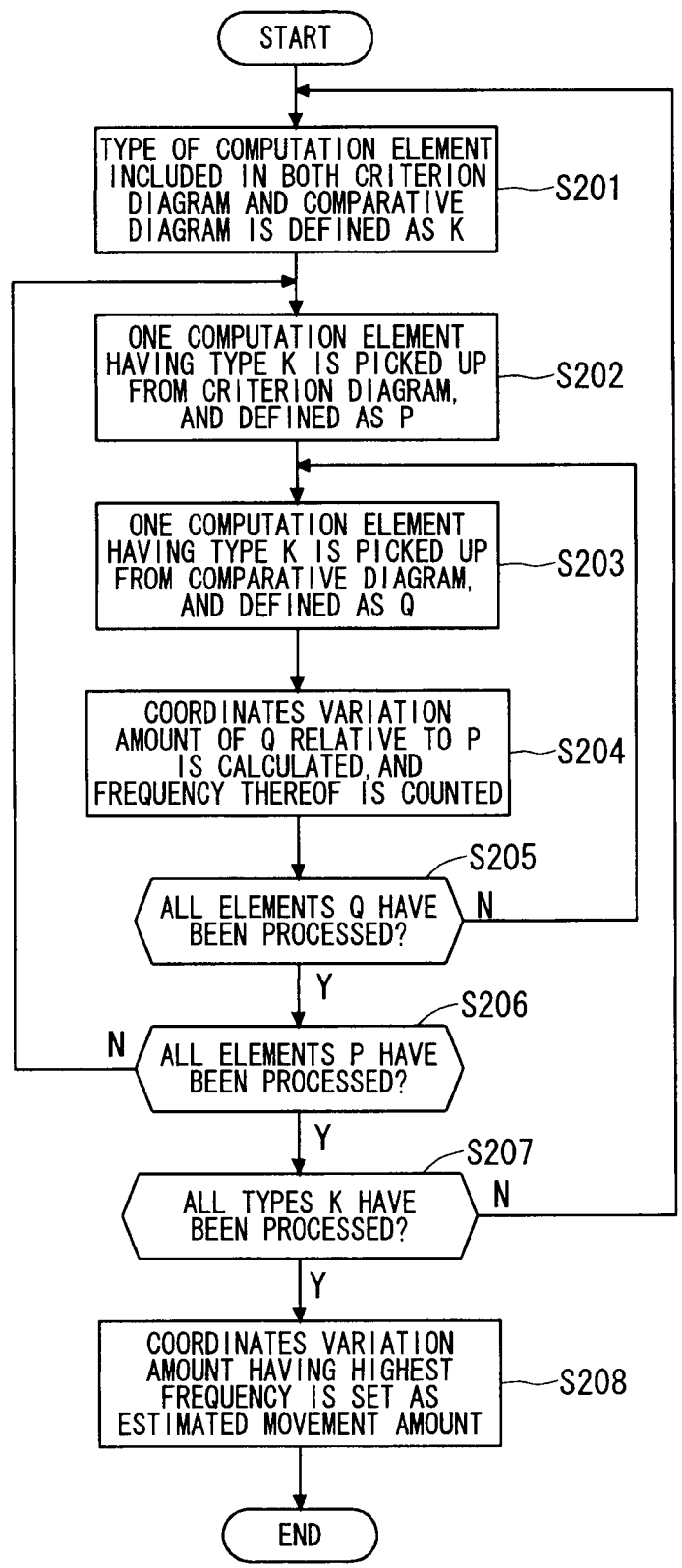
FIG. 2 is a flowchart showing a process performed by a movement amount estimation section 106 of the logic diagram search device according to the preferred embodiment 1.

FIG. 2 is a flowchart showing a process performed by the movement amount estimation section 106 of the preferred embodiment 1.

Firstly, in step S201, a type of a computation element that is included in both the criterion diagram and the comparative diagram is defined as a type K. Then, in step S202, one computation element whose type is the type K is picked up from the criterion diagram, and defined as a criterion computation element P. Then, in step S203, one computation element whose type is the type K is picked up from the comparative diagram, and defined as a comparative computation element Q. Although this preferred embodiment 1 describes a case where the types are coincident with each other, a type correspondence relation is not limited to the coincidence.

Then, in step S204, a coordinates variation amount of coordinates of the comparative computation element Q relative to the criterion computation element P is calculated, and a frequency thereof is counted. That is, the number of times a correspondence relation equal to the coordinates variation amount occurs is counted. Since the coordinates variation amount is a relative difference in coordinates between the criterion computation element P and the comparative computation element Q, a coordinates variation amount of the coordinate of the criterion computation element P relative to the comparative computation element Q may be calculated.

Then, in step S205, whether or not the above-described process is completed on all the comparative computation elements Q is examined. If the process is completed, the process proceeds to step S206, and if the process is not completed, the process proceeds to step S203.

In step S206, whether or not the above-described process is completed on all the criterion computation elements P is examined. If the process is completed, the process proceeds to step S207, and if the process is not completed, the process proceeds to step S202.

In step S207, whether or not the above-described process is completed on all the types K is examined. If the process is completed, the process proceeds to step S208, and if the process is not completed, the process proceeds to step S201.

In step S208, for example, a coordinates variation amount having the highest frequency is set as an estimated movement amount. This is because, in a case where a plurality of computation elements exhibit the same coordinates variation amount, it can be considered that an entire logic diagram (in other words, a group of computation elements) moves in that direction, and the coordinates variation amount having the highest frequency can be regarded as the most possible movement direction. Therefore, such a coordinates variation amount is set as the estimated movement amount which is a movement amount of the entire logic diagram. A method for determining the estimated movement amount is not limited to the above-described method. Other methods, such as changing a weighting in counting depending on a movement direction, are also adoptable.

Figures 9, 10:
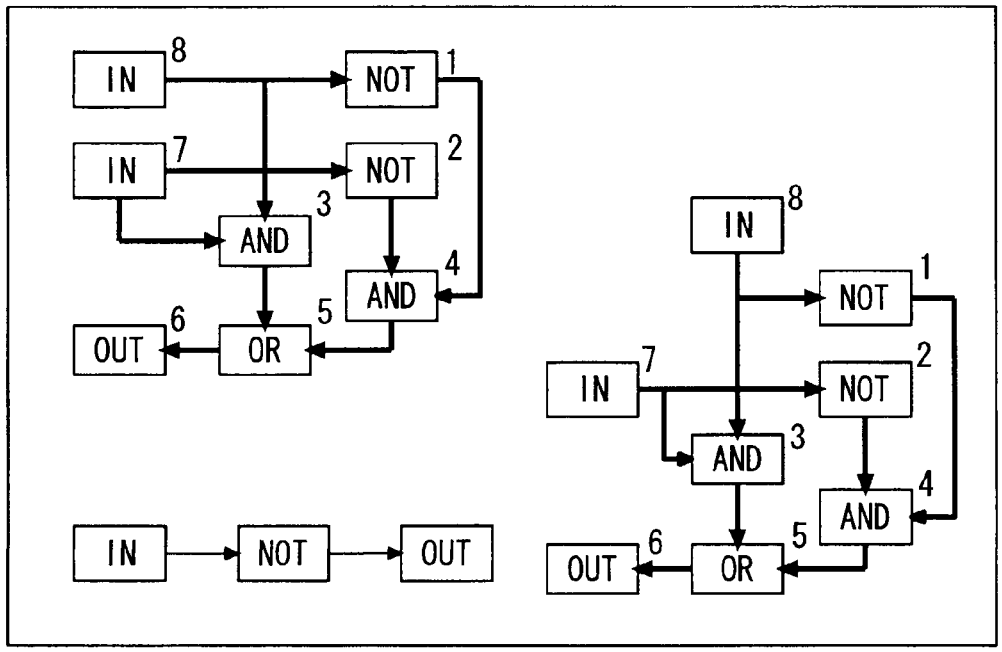
FIG. 9 is a diagram showing a result of the process performed by the computation element/signal line correspondence calculation section 108 of the logic diagram search device according to the preferred embodiment 1.
FIG. 10 is a data diagram showing the process performed by the movement amount estimation section 106 of the logic diagram search device according to the preferred embodiment 1.

FIG. 10 shows an example of calculation data of the coordinates variation amount. Coordinates variation amounts from P1, P2, and P3 to Q1, Q2, and Q3, respectively, of the computation element of the type K are calculated. The coordinates variation amount regarding P1 is equal to the coordinates variation amount regarding P3. Therefore, the counts of this coordinates variation amount are summed. Although an X-Y coordinate is used to represent the coordinates variation, a way of the representation is not limited to this coordinate system.

In a part shown in FIG. 10, the coordinates variation amounts from different elements P1, P2, and P3, respectively, are calculated. However, for example, the coordinates variation amounts from P1 to Q2 and from P1 to Q3 are similarly calculated. Regarding, among all the coordinates variation amounts, coordinates variation amounts exhibiting the same variation, the counts thereof are summed.

Considering not only a parallel movement but also a predetermined rotation amount, the movement of the entire logic diagram described above is also applicable to a case where a rotational movement is combined.

Figure 3:
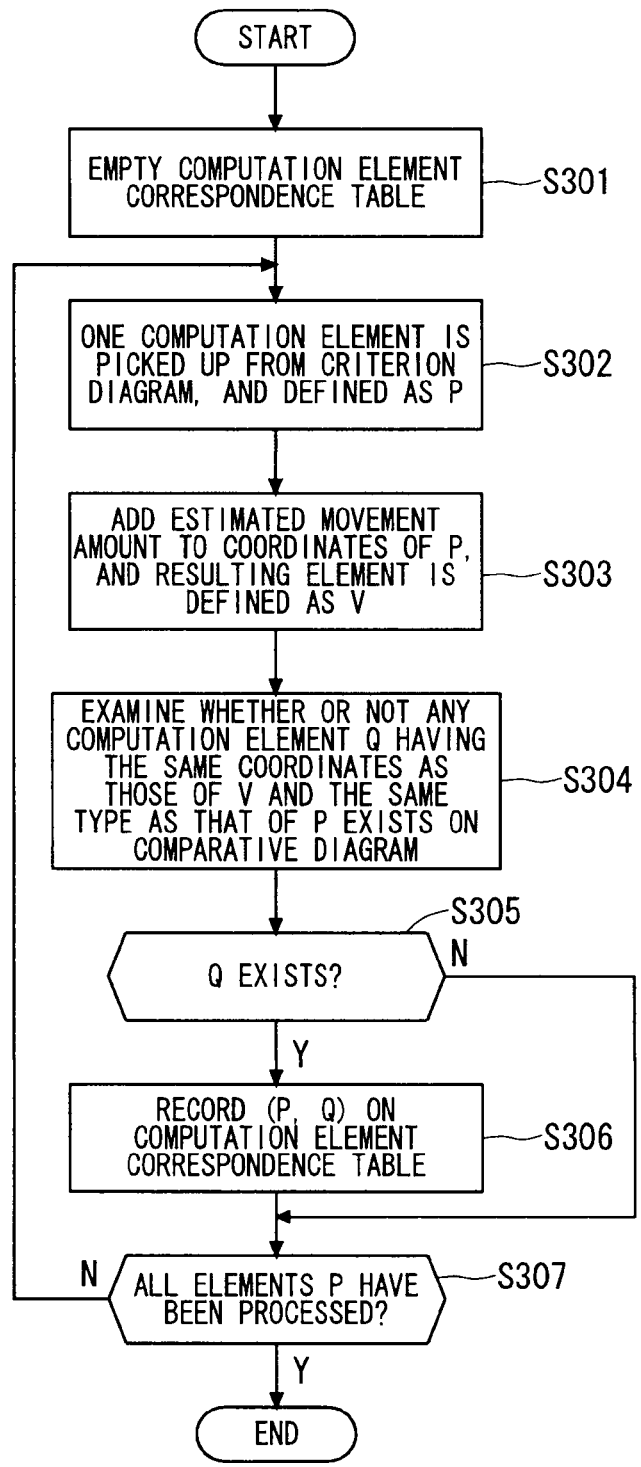
FIG. 3 is a flowchart showing a process performed by a temporary computation element correspondence calculation section 107 of the logic diagram search device according to the preferred embodiment 1.

FIG. 3 is a flowchart showing a process performed by the temporary computation element correspondence calculation section 107 according to the preferred embodiment 1.

Firstly, in step S301, a computation element correspondence table is emptied. Then, in step S302, one computation element is picked up from the criterion diagram, and defined as the criterion computation element P. Then, in step S303, the estimated movement amount is added to the coordinates of the criterion computation element P, and a resulting element is defined as a moved computation element V.

Then, in step S304, whether or not any comparative computation element Q whose coordinates are coincident with the coordinates of the moved computation element V and whose type is coincident with the type of the criterion computation element P exists on the comparative diagram, is examined.

FIG. 11 shows an example of data indicating whether or not any comparative computation element Q whose coordinates are coincident with the coordinates of the moved computation element V and whose type is coincident with the type of the criterion computation element P exists on the comparative diagram. Regarding P1 and P3, it is determined that such a comparative computation element Q exists, because the coordinates of the moved computation element V are coincident with the coordinates of the comparative computation element Q (Q1, Q3), and the type K is also coincident. In a case of P2, on the other hand, it is determined such a comparative computation element Q does not exist.

Although this preferred embodiment 1 shows a case where the coordinates are coincident, a coordinates correspondence relation is not limited to the coincidence.

Then, in step S305, if such a comparative computation element Q exists on the comparative diagram, the process proceeds to step S306, and if such a comparative computation element Q does not exist on the comparative diagram, the process proceeds to step S307.

In step S306, (P, Q) is recorded on the computation element correspondence table. In step S307, whether or not the above-described process is completed on all the criterion computation elements P is examined. If the process is not completed, the process proceeds to step S302, and if the process is completed, the process is terminated.

FIG. 12 shows an example of data indicating the computation element correspondence table regarding (P, Q). The table indicates that P1 and P3 correspond to Q1 and Q3, respectively. P2 will be described later.

Figure 4:
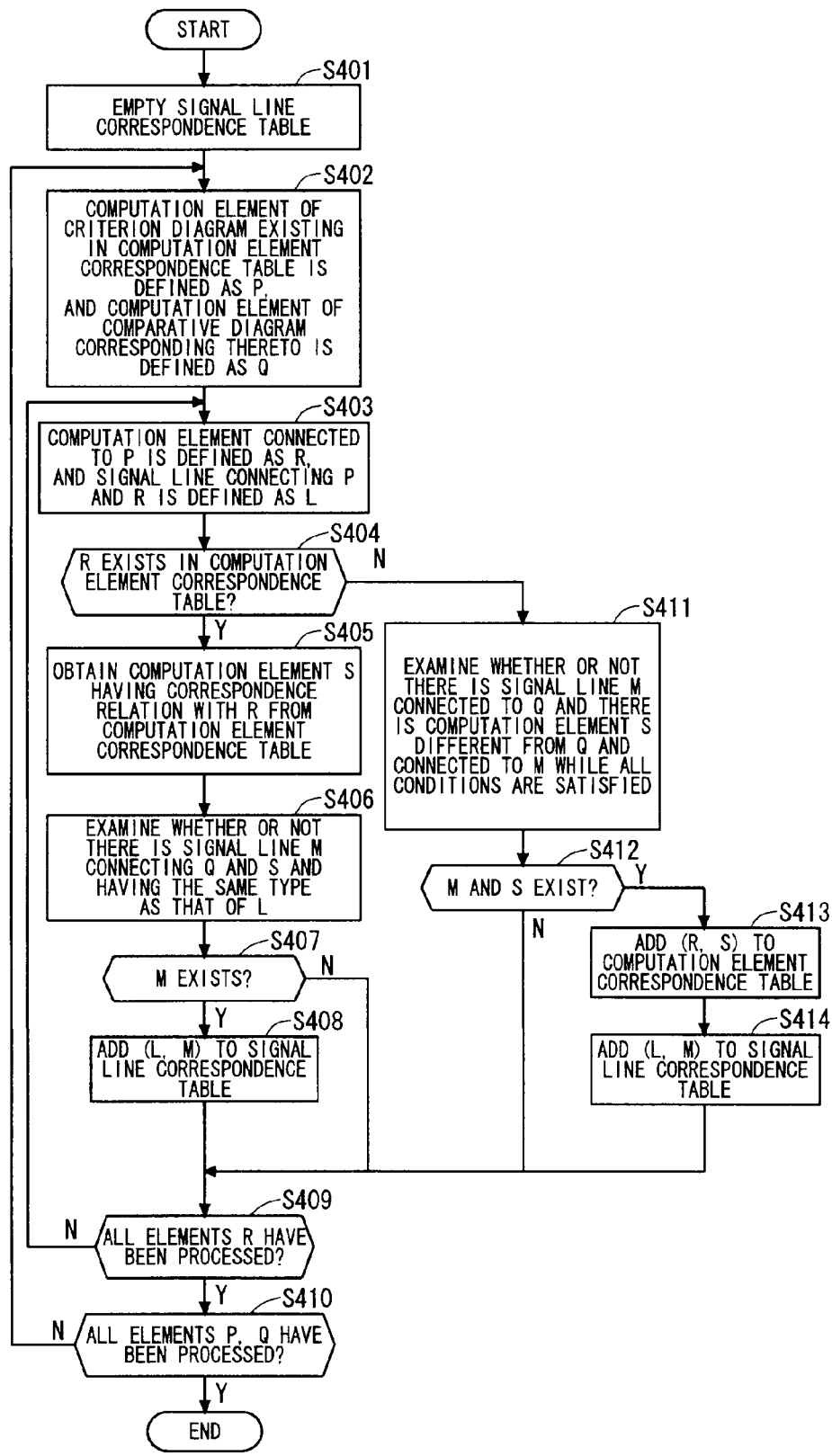
FIG. 4 is a flowchart showing a process performed by a computation element/signal line correspondence calculation section 108 of the logic diagram search device according to the preferred embodiment 1.

FIG. 4 is a flowchart showing a process performed by the computation element/signal line correspondence calculation section 108 according to the preferred embodiment 1.

Firstly, in step S401, a signal line correspondence table is emptied. Then, in step S402, the computation element of the criterion diagram existing in the computation element correspondence table is defined as a criterion computation element P, and the computation element of the comparative diagram corresponding thereto is defined as a comparative computation element Q. Then, in step S403, a computation element different from the criterion computation element P and connected to a criterion signal line L that is further connected to the criterion computation element P is defined as a connected computation element R.

Then, in step S404, whether or not the connected computation element R exists in the computation element correspondence table is examined. If the connected computation element R exists in the computation element correspondence table, the process proceeds to step S405. If the connected computation element R does not exist in the computation element correspondence table, the process proceeds to step S411.

In step S405, a connected corresponding computation element S having a correspondence relation with the connected computation element R is obtained from the computation element correspondence table.

Then, in step S406, whether or not there is a comparative signal line M that connects the comparative computation element Q and the connected corresponding computation element S to each other and that has the type coincident with the type of the criterion signal line L, is examined.

Then, in step S407, if there is such a comparative signal line M, the process proceeds to step S408, and if there is not such a comparative signal line M, the process proceeds to step S409.

In step S408, (L, M) is added to the signal line correspondence table, and the process proceeds to step S409.

FIG. 13 shows an example of data indicating the signal line correspondence table regarding (L, M). The table indicates that a signal line connecting P1 and P3 to each other corresponds to a signal line connecting Q1 and Q3 to each other. A signal line connecting P1 and P2 to each other will be described later.

In step S411, whether or not, while all "conditions" are satisfied, there is a comparative signal line M connected to the comparative computation element Q and there is a connected corresponding computation element S different from the comparative computation element Q and connected to the comparative signal line M, is examined.

The conditions mentioned above include a condition 1: the comparative signal line M does not exist in the signal line correspondence table, a condition 2: the connected corresponding computation element S does not exist in the computation element correspondence table, a condition 3: the type of the criterion signal line L is coincident with the type of the comparative signal line M, and a condition 4: the type of the connected computation element R is coincident with the type of the connected corresponding computation element S.

Then, in step S412, if there are such a comparative signal line M and such a connected corresponding computation element S, the process proceeds to step S413, and if at least one of such a comparative signal line M and such a connected corresponding computation element S does not exist, the process proceeds to step S409.

In step S413, (R, S) is added to the computation element correspondence table. Then, in step S414, (L, M) is added to the signal line correspondence table. Then, the process proceeds to step S409.

That is, as shown in FIG. 12, if Q2 satisfies the above-described conditions relative to P2, they are added to the computation element correspondence table regarding (P, Q).

Moreover, as shown in FIG. 13, if the signal line connecting Q1 and Q2 to each other satisfies the above-described conditions relative to the signal line connecting P1 and P2 to each other, they are added to the signal line correspondence table regarding (L, M).

In step S409, whether or not the process is completed on all the connected computation elements R is examined. If the process is not completed, the process proceeds to step S403, and if the process is completed, the process proceeds to step S410.

In step S410, whether or not the process is completed on all the criterion computation elements P and all the comparative computation elements Q is examined. If the process is not completed, the process proceeds to step S402, and if the process is completed, the process is terminated.

Steps S411 to S414 may be omitted. To be specific, if the connected computation element R does not exist in the computation element correspondence table, the process may proceed to step S409 to determine whether or not the process is completed on all the connected computation elements R. In this case, calculation of the degree of similarity is easy, thus enabling the process to be performed at a higher speed.

Furthermore, in the similarity degree calculation section 109, the degree of similarity between the criterion diagram and the comparative diagram is calculated based on the correspondence relations of the computation elements and the signal lines that are recorded in the computation element correspondence table and the signal line correspondence table, respectively.

Here, in this preferred embodiment 1, the correspondence relations of the computation elements and the signal lines in the criterion diagram and the comparative diagram are recorded by using correspondence tables. However, it is not always necessary to prepare the correspondence tables. No particular limitation is put on a manner of indicating the correspondence relations, as long as it can indicate the correspondence relations of the computation elements and the signal lines in both diagrams.

Next, a specific description will be given to the processes performed by the movement amount estimation section 106, the temporary computation element correspondence calculation section 107, and the computation element/signal line correspondence calculation section 108, with reference to FIG. 5 as the criterion diagram and FIG. 6 as the comparative diagram.

Figure 5:
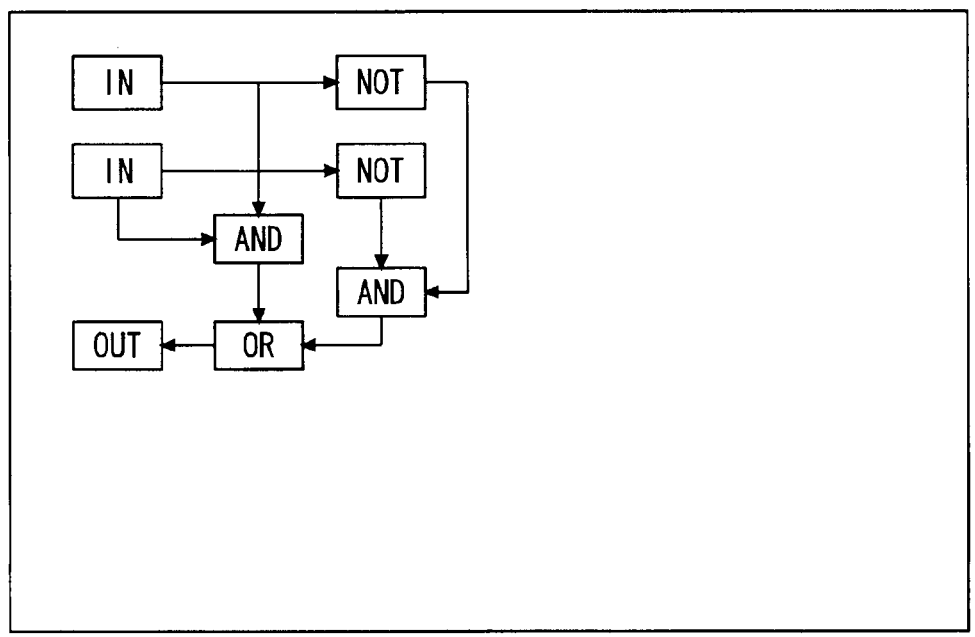
FIG. 5 is a diagram showing an example of a logic diagram that is inputted as a criterion diagram in the logic diagram search device according to the preferred embodiment 1.

FIG. 5 shows an example of a logic diagram inputted as the criterion diagram. The computation element, the signal line, a signal direction are indicated by a rectangle, a line, and an arrow, respectively.

The word "N" represents a computation element having a terminal of 0-input/1-output, which indicates an input from the outside. The word "OUT" represents a computation element having a terminal of 1-input/0-output, which indicates an output to the outside. The words "AND" and "OR" represent computation elements having terminals of 2-input/1-output, which perform a logical product and a logical sum, respectively. The word "NOT" represents a computation element having a terminal of 1-input/1-output, which provides a negation. The types of all the signal lines shown herein are binary (true or false).

Figure 6:
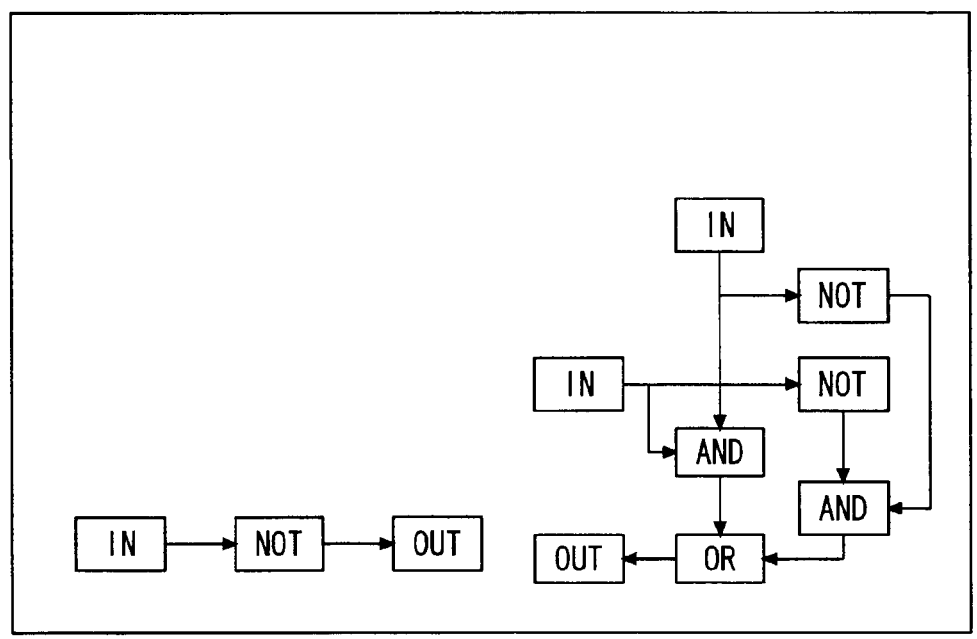
FIG. 6 is a diagram showing an example of a logic diagram that is inputted as a comparative diagram in the logic diagram search device according to the preferred embodiment 1.

FIG. 6 shows an example of a logic diagram inputted as the comparative diagram. A logic similar with the logic shown in a upper left part of FIG. 5 is shown in a lower right part of FIG. 6, and moreover a new logic is additionally shown in a lower left of FIG. 6.

Figure 7:
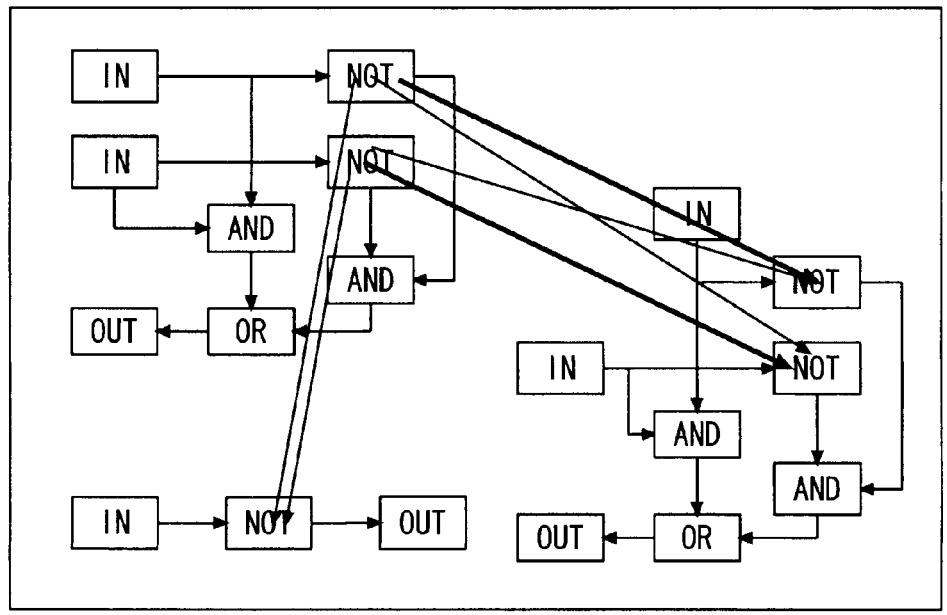
FIG. 7 is a diagram showing a part of the process performed by the movement amount estimation section 106 of the logic diagram search device according to the preferred embodiment 1.

FIG. 7 is a diagram showing a part of the process performed by the movement amount estimation section 106. Here, the type K of the computation element in step S201 (see FIG. 2) is "NOT", and the criterion diagram and the comparative diagram are superimposed on each other.

A transverse arrow indicates the coordinates variation amount obtained in step S204 (see FIG. 2). Although many patterns of the coordinates variation amount are calculated, the coordinates variation amount having the highest frequency in step S208 is finally adopted as the estimated movement amount (indicated by the bold arrows in FIG. 7).

Figure 8:
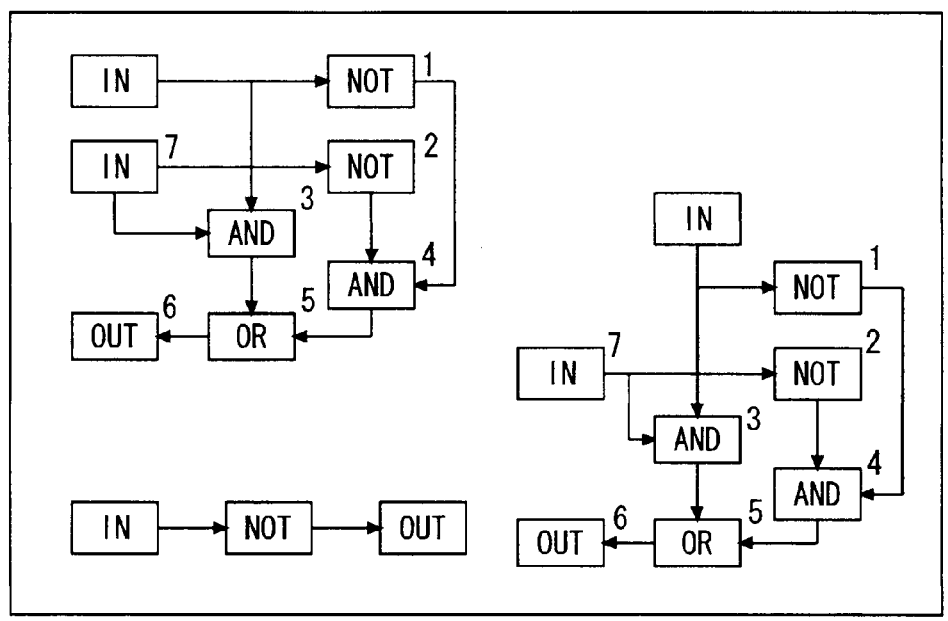
FIG. 8 is a diagram showing a result of the process performed by the temporary computation element correspondence calculation section 107 of the logic diagram search device according to the preferred embodiment 1.

FIG. 8 is a diagram showing a result of the process performed by the temporary computation element correspondence calculation section 107. The criterion diagram and the comparative diagram are superimposed on each other, and any corresponding computation elements are given the same numeral.

FIG. 9 is a diagram showing a result of the process performed by the computation element/signal line correspondence calculation section 108. Similarly to FIG. 8, the criterion diagram and the comparative diagram are superimposed on each other, and any corresponding computation elements are given the same numeral. Additionally, any signal lines corresponding to each other are indicated by bold lines.

The similarity degree calculation section 109 calculates the degree of similarity between the criterion diagram and the comparative diagram, based on the computation element correspondence table and the signal line correspondence table obtained by the computation element/signal line correspondence calculation section 108.

The degree of similarity is calculated based on the degree of the computation elements and the signal lines having correspondence among the computation elements and the signal lines in the criterion diagram and the comparative diagram. For example, it is desirable that the degree of similarity is an increasing function of the number of computation elements and signal lines having correspondence between both diagrams, and also is a decreasing function of the number of computation elements and signal lines having no correspondence between both diagrams. One example of such a function is as follows.

The degree of similarity=$2 \cdot (\alpha Na + (1-\alpha)La)/(\alpha(N0+N1)+(1-\alpha)(L0+L1))$, where:

Na: the number of computation elements having correspondence between the criterion diagram and the comparative diagram;

La: the number of signal lines having correspondence between the criterion diagram and the comparative diagram;

N0: the number of computation elements in the criterion diagram;

L0: the number of signal lines in the criterion diagram;

N1: the number of computation elements in the comparative diagram;

L1: the number of signal lines in the comparative diagram; and

α: parameter (taking a value of zero to one).

In a case where the criterion diagram and the comparative diagram are logically coincident with each other, (Na=N0=N1, La=L0=L1) is established. Therefore, the degree of similarity described above is one. In a case where the criterion diagram and the comparative diagram are completely not coincident with each other (for example, in a case where (Na=La=0) is established and there is no coincidence in the types of the computation elements contained), the degree of similarity described above is zero.

The α is a parameter. When α is one, the degree of similarity is calculated in consideration of only the correspondence relation of the computation element. When α is zero, the degree of similarity is calculated in consideration of only the correspondence relation of the signal line. By adjusting the value of this parameter, the degree of consideration of the computation element and the signal line can be set. The above-described formula for calculating the degree of similarity is merely an example, and a calculation formula is not limited thereto.

Through the above-described calculation being sequentially performed on object images that are the logic diagrams stored in the logic diagram storage section 1000, the similarity degree calculation section 109 obtains the degree of similarity. According to this degree of similarity, the search result display section 110 displays titles, and the like, of the logic diagrams in a juxtaposing manner, and presents the search result to a searcher. It may be also acceptable that a search section mainly for searching and a display section mainly for displaying are separately provided.

<A-3. Effects>

In the preferred embodiment 1 according to the present invention, the logic diagram search device includes: the computation element position detection section 103 and the computation element type detection section 104 serving as a detection section; the movement amount estimation section 106; the temporary computation element correspondence calculation section 107 included in a correspondence generation section; and the similarity degree calculation section 109. The detection section detects the coordinates variation amount between each computation element in the criterion diagram and a computation element in the comparative diagram whose type corresponds to the type of the computation element in the criterion diagram. The movement amount estimation section 106 estimates the diagram movement amount between the criterion diagram and the comparative diagram based on the coordinates variation amount. The temporary computation element correspondence calculation section 107 determines whether or not the coordinates and the type of the computation element in the criterion diagram correspond to those in the comparative diagram, based on the diagram movement amount. The correspondence generation section includes the computation element/signal line correspondence calculation section 108 that generates correspondence between the signal line in the criterion diagram connecting the computation elements that have been objects of a correspondence generation operation, and the signal line in the comparative diagram connecting the computation elements that have been objects of the correspondence generation operation. The similarity degree calculation section 109 calculates the degree of similarity between the criterion diagram and the comparative diagram based on the corresponding computation elements and signal lines. Accordingly, the correspondence can be generated between the computation elements and the signal lines conforming to the diagram movement amount, to appropriately calculate the degree of similarity between the criterion diagram and the comparative diagram. Therefore, a logic diagram logically similar with the logic diagram supplied from the searcher can be searched for with accuracy and at a high speed from a plurality of logic diagrams.

In the preferred embodiment 1 according to the present invention, in the logic diagram search device, the movement amount estimation section 106 counts the number of times the coordinates variation amount is detected, and estimates the diagram movement amount based on the most frequently counted coordinates variation amount. This enables an appropriate estimation of a movement distance and a movement direction of the entire group of computation elements in each of the criterion diagram and the comparative diagram. Thereby, the degree of similarity can be determined with an increased accuracy.

In the preferred embodiment 1 according to the present invention, in the logic diagram search device, the computation element/signal line correspondence calculation section 108 serving as the correspondence generation section moves the computation element in either one of the criterion diagram and the comparative diagram. Even if the coordinates of this computation element in the criterion diagram do not have correspondence with those in the comparative diagram, this computation element in each of the criterion diagram and the comparative diagram is connected via the signal line to the computation element that has been the object of the correspondence generation operation. Additionally, if the type of this computation element and the type of the signal line connected to this computation element have correspondence between both diagrams, the correspondence is generated between the computation element and the signal line in the criterion diagram and the computation element and the signal line in the comparative diagram. This makes to possible to track the signal line from the computation element whose correspondence is known. Therefore, more detailed correspondence can be derived based on this signal line. Thereby, the degree of similarity can be determined with a further increased accuracy.

This also makes it possible to perform a more accurate similarity search on an edited version of the criterion diagram.

In the preferred embodiment 1 according to the present invention, in the logic diagram search device, the criterion diagram input section 102 serving as the supply section selects one of the logic diagrams stored in the logic diagram storage section 1000, and at least partially edits the selected one, and then supplies the edited one as the criterion diagram. Therefore, even in a case where the criterion diagram is edited, it can be an object of the similarity search.

In the preferred embodiment 1 according to the present invention, in the logic diagram search device, the similarity degree calculation section 109 calculates the degree of similarity based on the degree of the computation elements and the signal lines having correspondence among the computation elements and the signal lines in the criterion diagram and the comparative diagram. As a result, a criterion diagram and a comparative diagram that have a greater number of corresponding computation elements and signal lines are determined to be similar diagrams. Thus, an accurate similarity search can be performed.

B. Preferred Embodiment 2

<B-1. Configuration>

Figure 14:
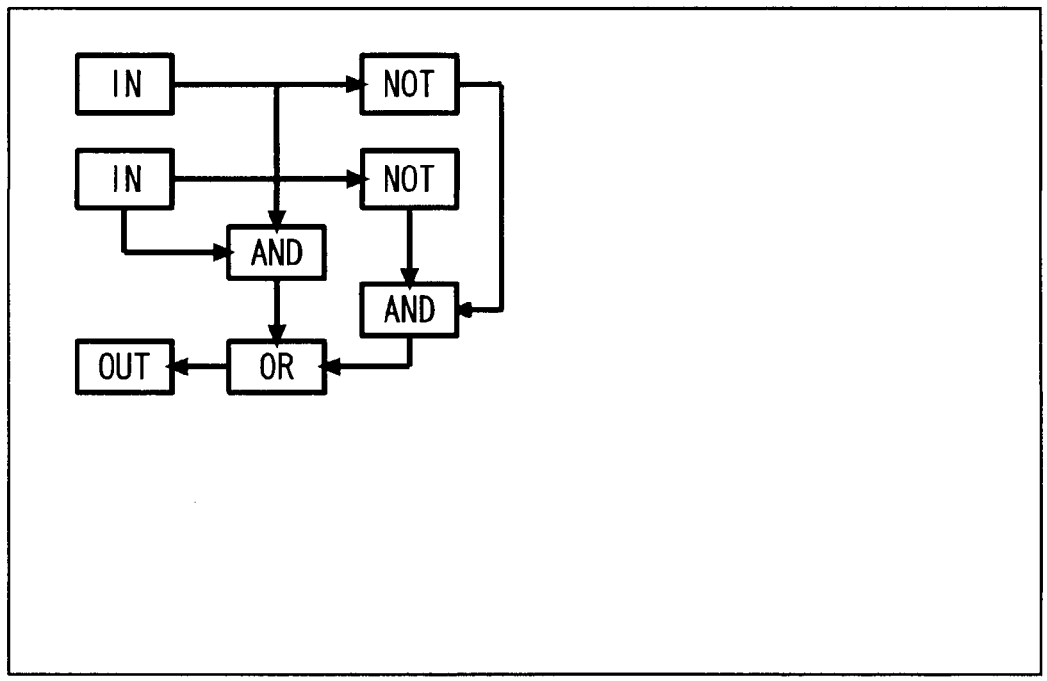
FIG. 14 is a diagram showing an example of a criterion diagram displayed by a search result display section 110 of a logic diagram search device according to a preferred embodiment 2.
Figure 15:
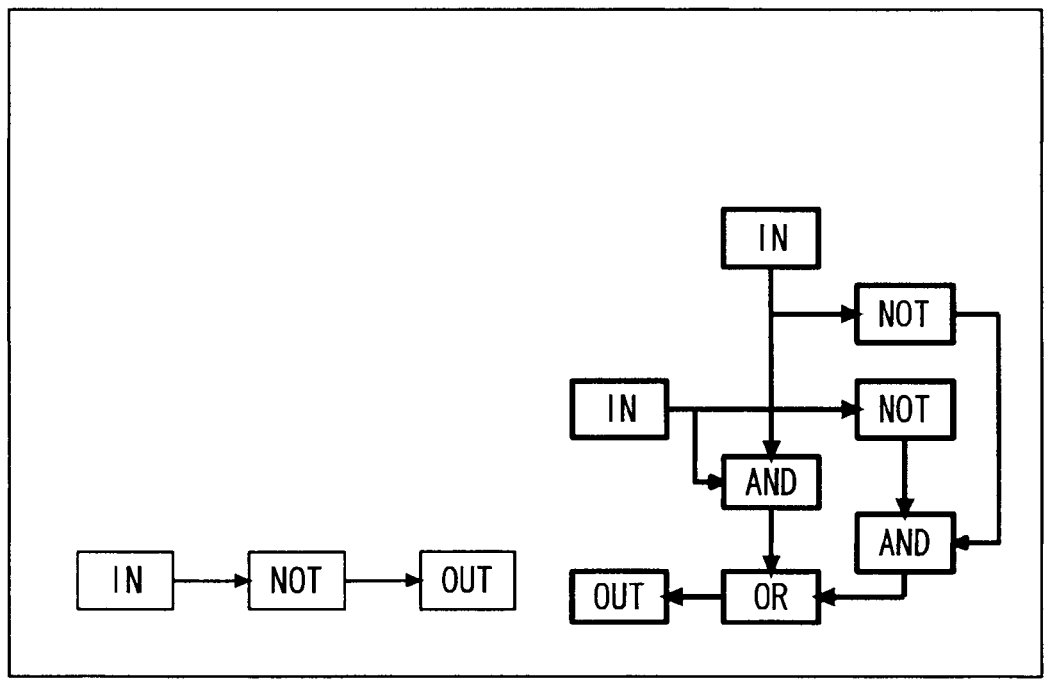
FIG. 15 is a diagram showing an example of a comparative diagram displayed by the search result display section 110 of the logic diagram search device according to the preferred embodiment 2.

FIGS. 14 and 15 show an example of display contents displayed by the search result display section 110 in a logic diagram search device according to a preferred embodiment 2.

Here, it is assumed that the diagram of FIG. 5 and the diagram of FIG. 6 are supplied as the criterion diagram and the comparative diagram, respectively (see the preferred embodiment 1). FIGS. 14 and 15 show an example of the criterion diagram and an example of the comparative diagram, respectively, displayed by the search result display section 110.

In FIGS. 14 and 15, the computation elements and the signal lines having the correspondence relation based on a result of the calculation made by the computation element/signal line correspondence calculation section 108 are indicated in boldface.

As clearly seen from FIGS. 14 and 15, in the logic diagram search device according to the preferred embodiment 2, the search result display section 110 can make a display in which a logically identical part and a logically different part, in other words, the corresponding computation elements and signal lines and non-corresponding computation elements and signal lines, are distinguished from each other in a manner clearly understandable to the searcher.

A manner of the display is not limited to the boldface. No particular limitation is put thereon, as long as the difference can be obviously distinguished.

<B-2. Effects>

In the preferred embodiment 2 according to the present invention, in the logic diagram search device, the search result display section 110 serving as the display section makes a display such that the corresponding computation elements and signal lines can be distinguished from the non-corresponding computation elements and signal lines. Thereby, in the logic diagram obtained as a result of the similarity search, which part is logically identical and which part is logically different can be made obvious.

C. Preferred Embodiment 3

<C-1. Configuration>

The similarity degree calculation section 109 calculates the degree of similarity between the criterion diagram and the comparative diagram based on the computation element correspondence table and the signal line correspondence table obtained by the computation element/signal line correspondence calculation section 108. As the method for calculating the degree of similarity, a method having a symmetric property is mentioned in the preferred embodiment 1. That is, in the method mentioned in the preferred embodiment 1, the degree of similarity does not change even if the criterion diagram and the comparative diagram are interchanged. Here, for calculating the degree of similarity, a method having no symmetric property is also conceivable. One example is as follows.

$$\text{The degree of similarity} = (\beta Na + (1-\beta)La)/(\beta N0 + (1-\beta)L0),$$

where:

Na: the number of computation elements having correspondence between the criterion diagram and the comparative diagram;

La: the number of signal lines having correspondence between the criterion diagram and the comparative diagram;

N0: the number of computation elements in the criterion diagram;

L0: the number of signal lines in the criterion diagram;

β: parameter (taking a value of zero to one).

The β is a parameter. When β is one, the degree of similarity is calculated in consideration of only the correspondence relation of the computation element. When β is zero, the degree of similarity is calculated in consideration of only the correspondence relation of the signal line. By adjusting the value of this parameter, the degree of consideration of the computation element and the signal line can be set.

<C-2. Effects>

In a case where the criterion diagram and the comparative diagram are logically coincident with each other and in a case where all parts of the criterion diagram are coincident with a part of the comparative diagram, (Na=N0, La=L0) is established. Therefore, the degree of similarity described above is one. In a case where the criterion diagram and the comparative diagram are completely not coincident with each other, (Na=La=0) is established. Therefore, the degree of similarity described above is zero.

Because of these characteristics, the above-described formula for calculating the degree of similarity is suitable for a case where a part of a logic is supplied as the criterion diagram and a comparative diagram including a similar part is searched for. The effects thereof are exerted in a case of supplying a logic diagram under development and searching for a similar diagram to thereby accelerate the development using a search result as reference information, and in a case of supplying a part of a logic diagram having a failure and searching for a similar diagram to thereby find a diagram including the same failure.

In the present invention, the preferred embodiments may be freely combined, any element of the configuration of each preferred embodiment may be modified, or alternatively any element of the configuration of each preferred embodiment may be omitted, within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A logic diagram search device comprising:
    a logic diagram storage section;
    a supply section;
    a detection section;
    a movement amount estimation section;
    a correspondence generation section; and
    a similarity degree calculation section,
    wherein
    said logic diagram storage section stores a plurality of logic diagrams including a comparative diagram that is a searching object,
    said supply section supplies a criterion diagram serving as a criterion to be compared with said comparative diagram,
    in said criterion diagram and said comparative diagram, a plurality of computation elements having one or more types and signal lines connecting said computation elements to each other are indicated,
    said detection section detects a coordinates variation amount between each of said computation elements in said criterion diagram, and said computation element in said comparative diagram having the type thereof corresponding to the type of said each of said computation elements in said criterion diagram,
    said movement amount estimation section estimates a diagram movement amount between said criterion diagram and said comparative diagram based on said coordinates variation amount,
    said correspondence generation section moves said computation element in either one of said criterion diagram and said comparative diagram based on said diagram movement amount, and determines whether or not coordinates and the type of said computation element in said criterion diagram have correspondence with those in said comparative diagram, and generates correspondence,
    said correspondence generation section generates correspondence between said signal line in said criterion diagram connecting said computation elements that have been objects of a correspondence generation operation, and said signal line in said comparative diagram connecting said computation elements that have been objects of said correspondence generation operation,
    said similarity degree calculation section calculates the degree of similarity between said criterion diagram and said comparative diagram based on said computation elements and said signal lines for which the correspondence is generated.

2. The logic diagram search device according to claim 1, wherein
    said movement amount estimation section counts the number of times said coordinates variation amount is detected, and estimates said diagram movement amount based on most frequently counted one of said coordinates variation amounts.

3. The logic diagram search device according to claim 1, wherein
    said correspondence generation section moves said computation element in either one of said criterion diagram and said comparative diagram, and even if the coordinates of said computation element in both diagrams do not have correspondence, said computation element in each of said criterion diagram and said comparative diagram is connected via said signal line to said computation element that has been the object of the correspondence generation operation, and additionally, if the type of said computation element and the type of said signal line connected to said computation element have correspondence between both diagrams, correspondence is generated between said computation element and said signal line in said criterion diagram and said computation element and said signal line in said comparative diagram.

4. The logic diagram search device according to claim 1, wherein
said supply section selects one of said logic diagrams stored in said logic diagram storage section, or selects and at least partially edits one of said logic diagrams stored in said logic diagram storage section, and then supplies a resulting diagram as said criterion diagram.

5. The logic diagram search device according to claim 1, wherein
said similarity degree calculation section calculates said degree of similarity based on the degree of said computation element and said signal line having the correspondence among said computation elements and said signal lines in said criterion diagram and said comparative diagram.

6. The logic diagram search device according to claim 1, further comprising:
a search section for performing a similarity search of said logic diagram based on said degree of similarity.

7. The logic diagram search device according to claim 1, further comprising:
a display section for displaying a list of said logic diagrams in accordance with said degree of similarity.

8. The logic diagram search device according to claim 7, wherein
said display section makes a display such that said computation element and said signal line having the correspondence can be distinguished from said computation element and said signal line having no correspondence.

* * * * *